United States Patent [19]

Margaroli et al.

[11] 4,220,080
[45] Sep. 2, 1980

[54] MACHINE FOR PITTING AND STUFFING OLIVES

[75] Inventors: John L. Margaroli, Oakland; Frederick J. Cimperman, Castro Valley, both of Calif.

[73] Assignee: Vistan Corporation, San Leandro, Calif.

[21] Appl. No.: 923,376

[22] Filed: Jul. 10, 1978

[51] Int. Cl.³ .............................................. A23N 4/08
[52] U.S. Cl. ...................................... 99/494; 99/549; 99/561; 99/565
[58] Field of Search ............... 99/494, 542, 546, 548, 99/544, 549, 552, 555, 556, 565, 559–561, 566; 426/282, 484, 485; 198/384, 631

[56] References Cited

U.S. PATENT DOCUMENTS

| 2,360,103 | 10/1944 | Britten | 99/544 |
|---|---|---|---|
| 2,406,736 | 9/1946 | Ashlock, Jr. | 99/544 |
| 2,418,805 | 4/1947 | Lindner | 99/542 |
| 2,643,694 | 6/1953 | Ashlock, Jr. | 99/494 |
| 4,090,439 | 5/1978 | Chall et al. | 99/494 |
| 4,096,795 | 6/1978 | Del Ser Gonzalez | 99/494 |
| 4,102,257 | 7/1978 | Gonzalez | 99/494 |

Primary Examiner—Harvey C. Hornsby
Assistant Examiner—Timothy F. Simone
Attorney, Agent, or Firm—Naylor, Neal & Uilkema

[57] ABSTRACT

First and second rotary turrets are connected by a drive belt or chain which carries cups to carry and support the olives while they are being pitted and stuffed. Pitting takes place as the belt passes around one of the turrets and stuffing takes place while the belt passes around the other turret.

A folded stuffing strip is fed radially of the stuffing turret and knives carried by the stuffing turret move transversely of the strip to cut off stuffing pieces and carry them away in vertical, stuffing alignment with the cups.

5 Claims, 14 Drawing Figures

MACHINE FOR PITTING AND STUFFING OLIVES

PRIOR ART

The most pertinent prior art relative to the subject inventions of which we are aware consists of patents issued to George W. Ashlock, Jr., the present assignee's predecessor in interest, and to the present assignee. Those of particular interest are U.S. Pat. Nos. 2,406,736, 2,407,126 and 2,935,104 which relate to pitters, pitting methods, and stripping means for pitting knives; U.S. Pat. Nos. 2,567,590, 2,637,653 and 2,643,694 which relate to olive stuffers; and U.S. Pat. No. 4,090,439 which relates to an olive pitter and stuffer.

SUMMARY OF THE INVENTION

The machine features a new and efficient pimento cut-off and feed system as well as a new way and means to control the width of the pimento stuffing strip.

Among the further features of the machine are the following: novel means in the pitting system for enabling relative adjustment of the pitting and coring knives to accommodate pits of different lengths; means to separate unstuffed olives from stuffed olives; means to adjust the unpitted olive feeder of the machine to handle different sizes of olives; and means to prevent olives from becoming stuck in the unpitted olive feeder.

These and other features, objects and advantages of the invention will be apparent from the following description taken in conjunction with the drawings forming part of this specification, and in which:

DESCRIPTION

Figure 1:
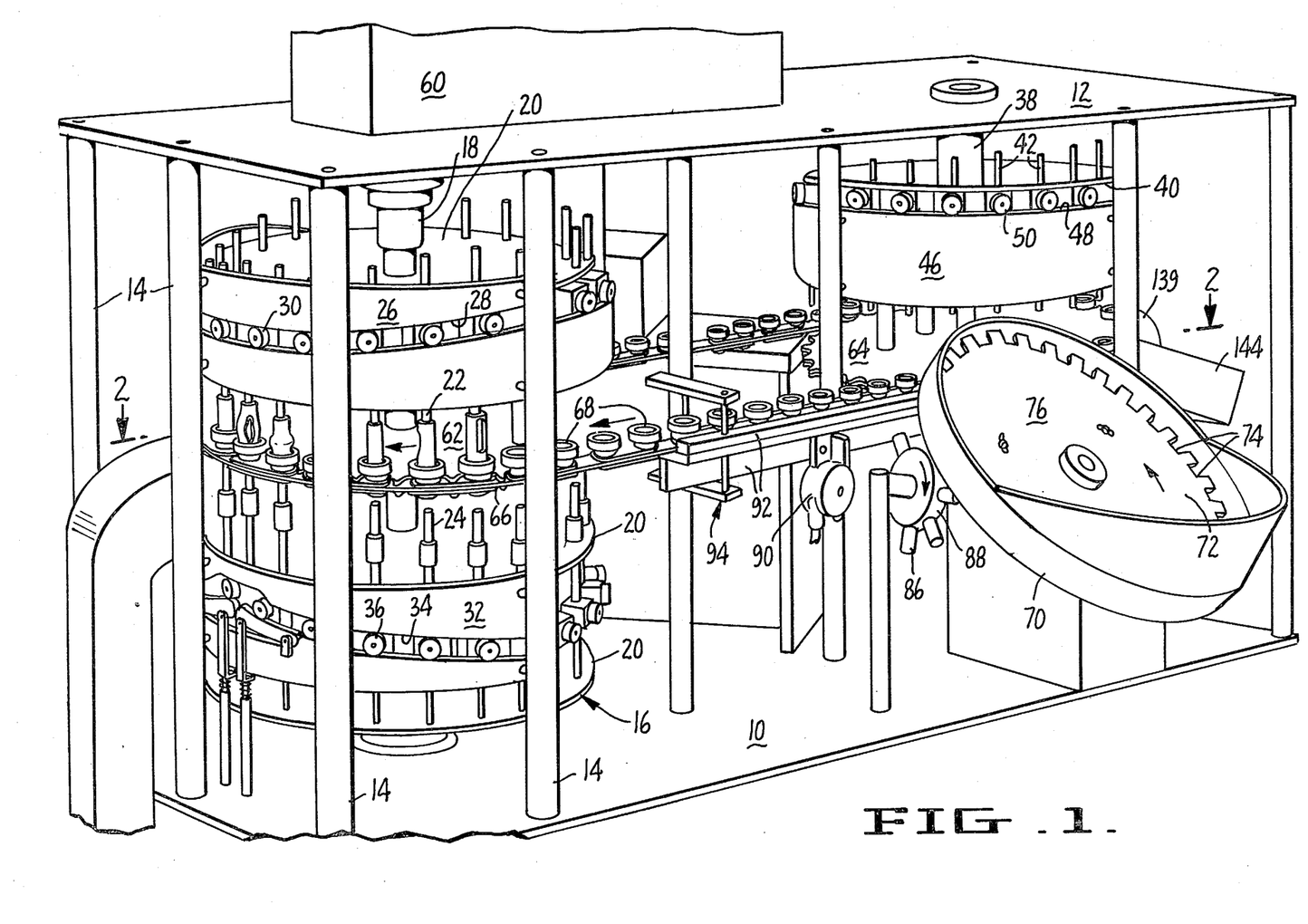
FIG. 1 is a view in perspective of the overall machine embodying the present inventions.
Figures 2, 3:
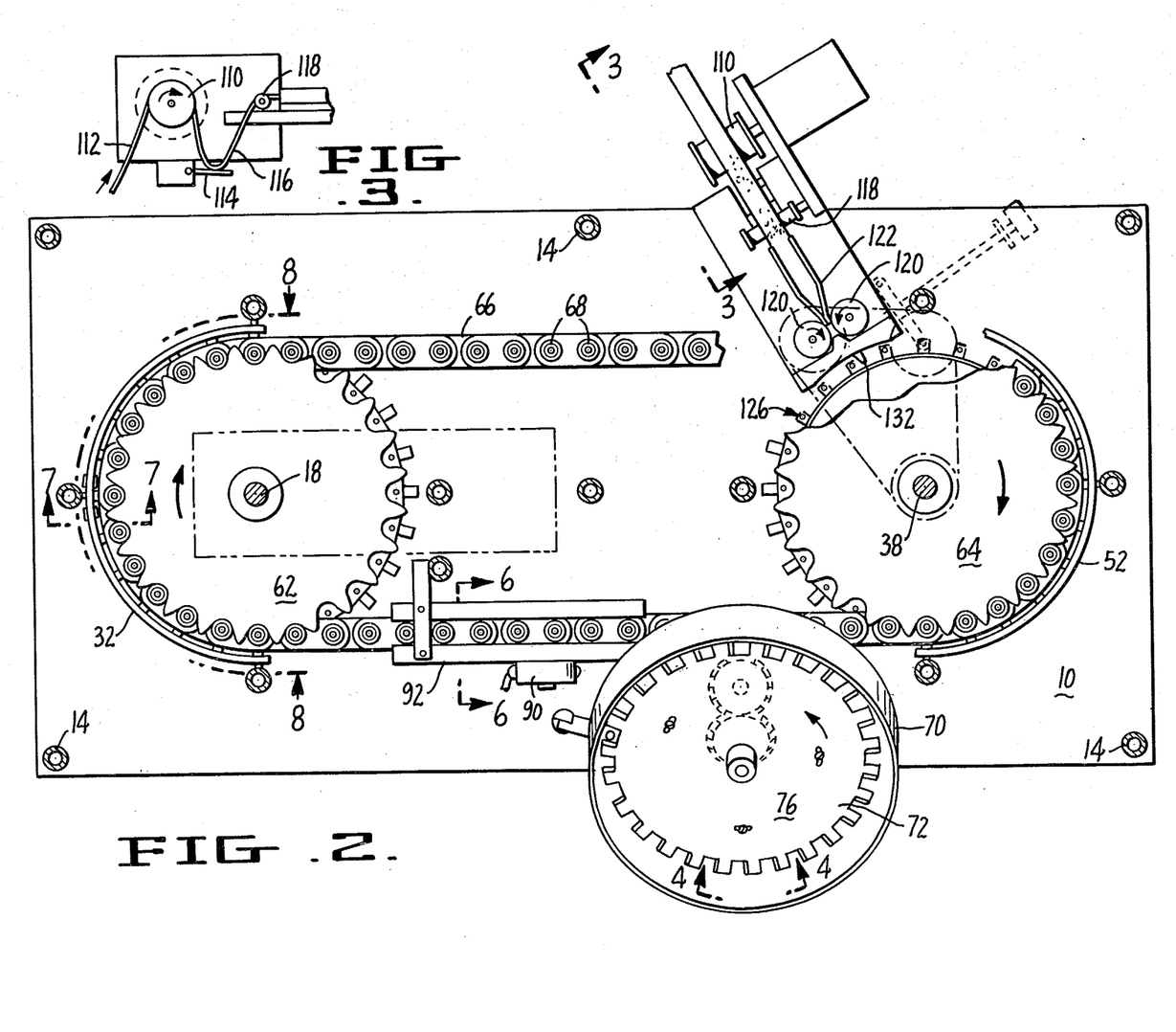
FIG. 2 is a view taken along lines 2—2 of FIG. 1.
FIG. 3 is a detail view taken along lines 3—3 of FIG. 2.

With reference to FIG. 1, the machine includes a supporting framework comprising plates 10 and 12 interconnected by posts 14.

Supported between the plates 10 and 12 is a pitting turret 16 comprising shaft 18, plates 20 secured to shaft 18, pitting knives 22 supported for longitudinal movement by an upper pair of the plates 20, coring knives 24 supported for longitudinal movement by a lower pair of the plates 20, means to reciprocate the pitting knives 22 comprising a cylindrical member 26 having defined therein a cam trackway 28, and cam followers 30 secured to the pitting knives 22 and adapted to travel in the trackway 28 to effect raising and lowering of the knives 22, and means to reciprocate the coring knives 24 comprising a cylindrical member 32 having defined therein a cam trackway 34, and cam followers 36 secured to the coring knives 24 and adapted to travel in the cam trackway 34 to effect raising and lowering of the knives 24. The cylindrical members 26 and 32 are fixedly attached to posts 14.

A second turret, the stuffing turret, is comprised of rotatable shaft 38, plates 40 attached to the shaft 38, hold-down rods 42 carried for longitudinal movement in plates 40, stuffing rods 44 carried for longitudinal movement in other plates 40, means to reciprocate the rods 42 comprising a cylindrical member 46 having a cam trackway 48 engaged by cam followers 50 secured to the rods 42, means to reciprocate the stuffer rods 44 comprising a cylindrical member 52 having a cam trackway 54 which is travelled by cam followers 56 secured to the stuffing rods 44.

One of the turrets is provided with drive means 60 including a motor, not shown. The second turret is driven by the powered turret by means comprising sprocket 62 secured to shaft 18, sprocket 64 attached to shaft 38 and link chain 66 which is in mesh with the sprockets 62 and 64. The chain 66 carries the olive cups 68.

Figures 4, 5, 6, 7:
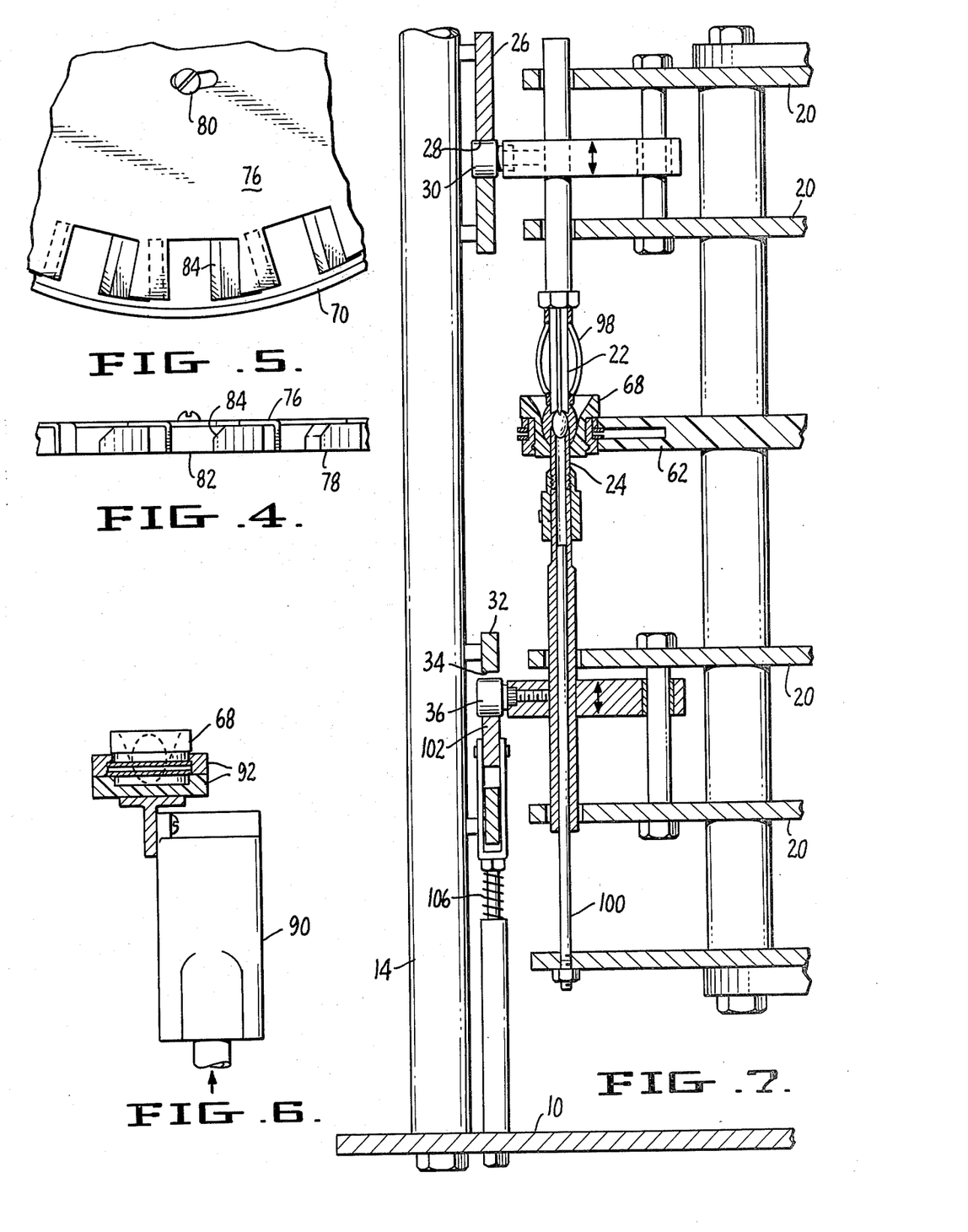
FIG. 4 is a enlarged detail veiw taken along lines 4—4 of FIG. 2.
FIG. 5 is a top plan view of the part of the machine shown in FIG. 4.
FIG. 6 is an enlarged detail view taken along lines 6—6 of FIG. 2.
FIG. 7 is an enlarged view taken along lines 7—7 of FIG. 2.

The machine is provided with an olive feeder comprising an inclined, stationary tray 70, a disc 72 rotatably mounted therein and having peripheral slots 74 to move olives from the lower end of the tray to the upper end for transfer to the cups 68 along a feed chute, not shown. Disc 72 comprises upper disc member 76 and lower disc member 78 adapted to be moved relative to each other by adjustment means 80 to vary the size of the olive discharge opening 82 of slots 74 in accordance with the size of the olives being handled. The olive discharge openings in the disc 78 are formed in part by inclined, camming surfaces 84 adapted to promote endwise feeding of the olives into the cups 68. The slots 74 traverse a stationary, imperforate backup plate or member, not shown, as the slots move the olives from the bottom to the top of tray 70. At the olive discharge point and thereafter for about 90° or so the slots 74 remain open. This enables the slots to be engaged by the fingers 86 of an idler wheel 88 mounted for rotation beneath the tray 70, the fingers 86 engaging the slots 74 in the manner of meshing gears. The rotation of disc 72 thus serves to drive the cog wheel 88 and the latter serves to poke free from the slots 74 any olives which may have become wedged or hung-up therein.

To assist in the orientation of the olives so that their long axes are vertically disposed in the cups, the machine is provided with a variable speed air vibrator 90 which is operable to vibrate a section of support rails 92 against and between which the cup-carrying link chain 66 passes. By means of pivot support means 94 the rails 92 have a maximum amplitude of vibration adjacent the tray 70 where the olives have just been fed into the cups 68 and a zero amplitude of vertical vibrational movement at the support means 94.

Figure 8:
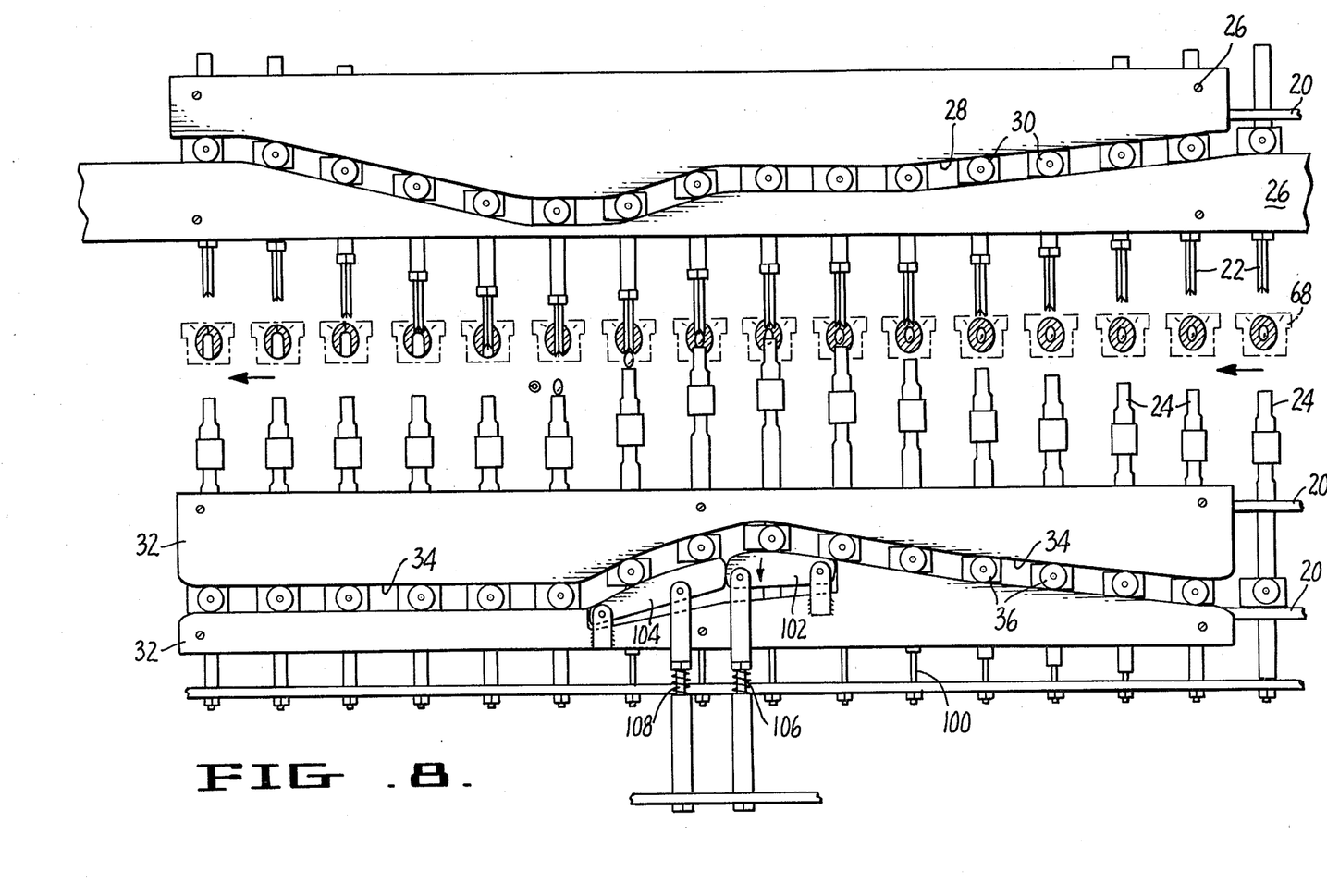
FIG. 8 is a layout view of the semi-circular portion indicated by lines 8—8 of FIG. 2.

With particular reference to FIGS. 1, 7 and 8, pitting takes place as follows. As each cup 68 moves onto the pitting turret it becomes synchronized and aligned with a pitting knife 22 and a coring knife 24. As shown in FIG. 8 the pitting and coring knives move toward each other into engagement with the pits, thereafter move downwardly together to carry the pits out of the olives, and thereafter separate so that the pitting knives move upwardly and out of the pitted olives. This movement is accomplished by travel of the cam followers 30 in cam trackway 28 and the travel of cam followers 36 in cam trackway 34. Slotted rubber stripper sleeves 98 (FIG. 7) compress against the olives as the pitting knives enter the olives and decompress as the pitting knives leave the olives, thereby serving to hold the pitted olives down in the cups in their oriented positions as the pitting knives 22 are withdrawn from the olives. Associated with each coring knife 24 is a fixed ejector rod 100 which serves to eject a pit from the upper end of the coring knife 24 as the coring knife continues to be moved downwardly relative to the rod 100.

Means are provided comprising downwardly yieldable cam trackway sections 102 and 104 to enable the pitting and coring knives to handle olive pits of different lengths. As shown in FIG. 8, these trackway sections 102 and 104 have fixed pivot ends and ends which are movable downwardly in opposition to the springs 106 and 108.

The pimento ribbon feed system comprises a drive roll 110 for the strip 112, a sensing switch 114 to deactivate roll 110 in response to the building up against the switch 114 of an over-supply loop 116 of the strip 112. The strip passes over an idler roll 118 in response to the pulling of the strip by powered pulling rolls 120, the rolls 120 serving to pull the strip through a strip folding chute 122 and to push the folded strip toward the strip cut-off and stuffer system hereinafter described.

Figure 9:
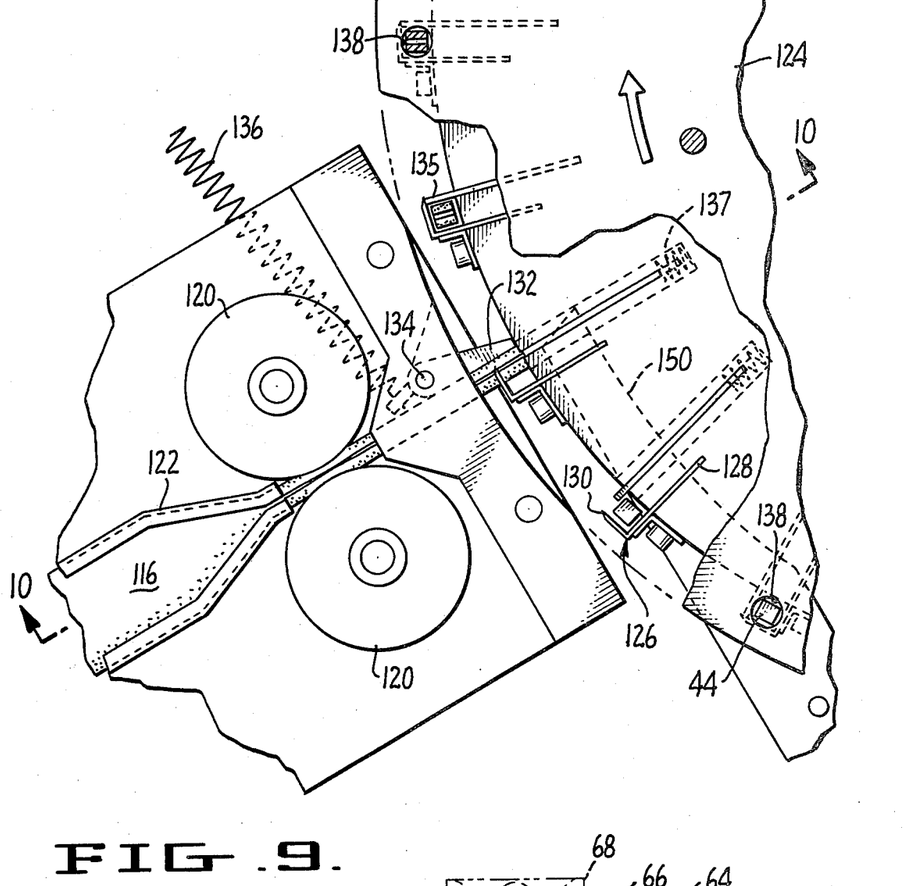
FIG. 9 is a top plan view of the pimento strip feeding, holding and cut-off sub-assembly.
Figure 10:
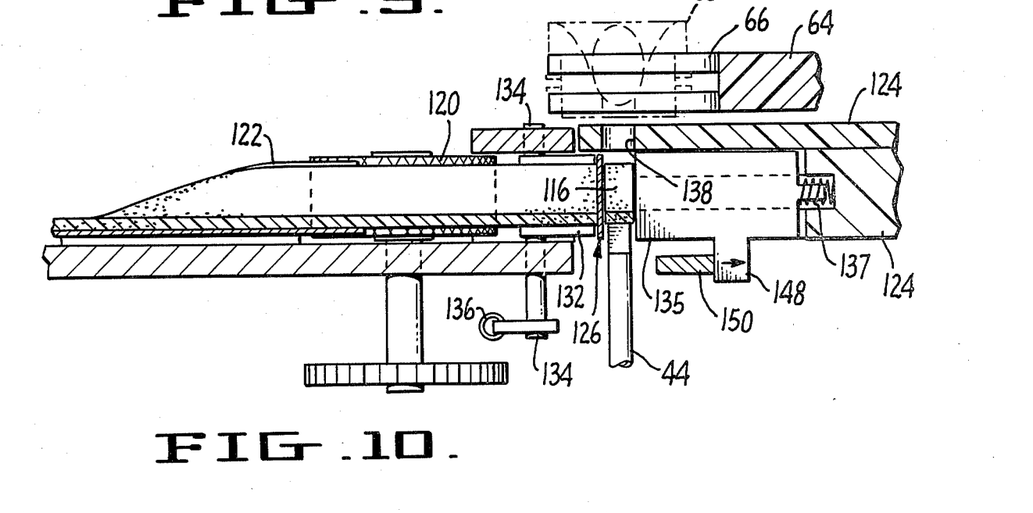
FIG. 10 is a view taken along lines 10—10 of FIG. 9.

The stuffing turret comprises a plate 124 (FIG. 9-13) which carries L-shaped knives 126 having shanks 128 and cutting edges 130. As the knives sweep through the pimento cut-off station they cut the folded pimento strip into stuffing pieces against the backup resistance offered by an anvil member 132. Member 132 is pivoted at 134 and is urged toward its solid line position shown in FIG. 9 by spring 136. The member 132 is yieldingly moved out of the path of the knives 130 by the knives themselves. As the member moves out of backing relation to each cut-off stuffing piece a blade member 135 slides into backup relation to the cut-off stuffing piece under the influence of its spring 137 so that the cut-off piece is disposed in enclosed, captured relation by plate 124, knife 130 and a blade member 135. The pockets defined by 124, 126 and 135 are in vertical alignment with apertures 138 formed in plate 124, the latter being aligned with the openings formed at the bottom of the olive pockets 68.

Figure 14:
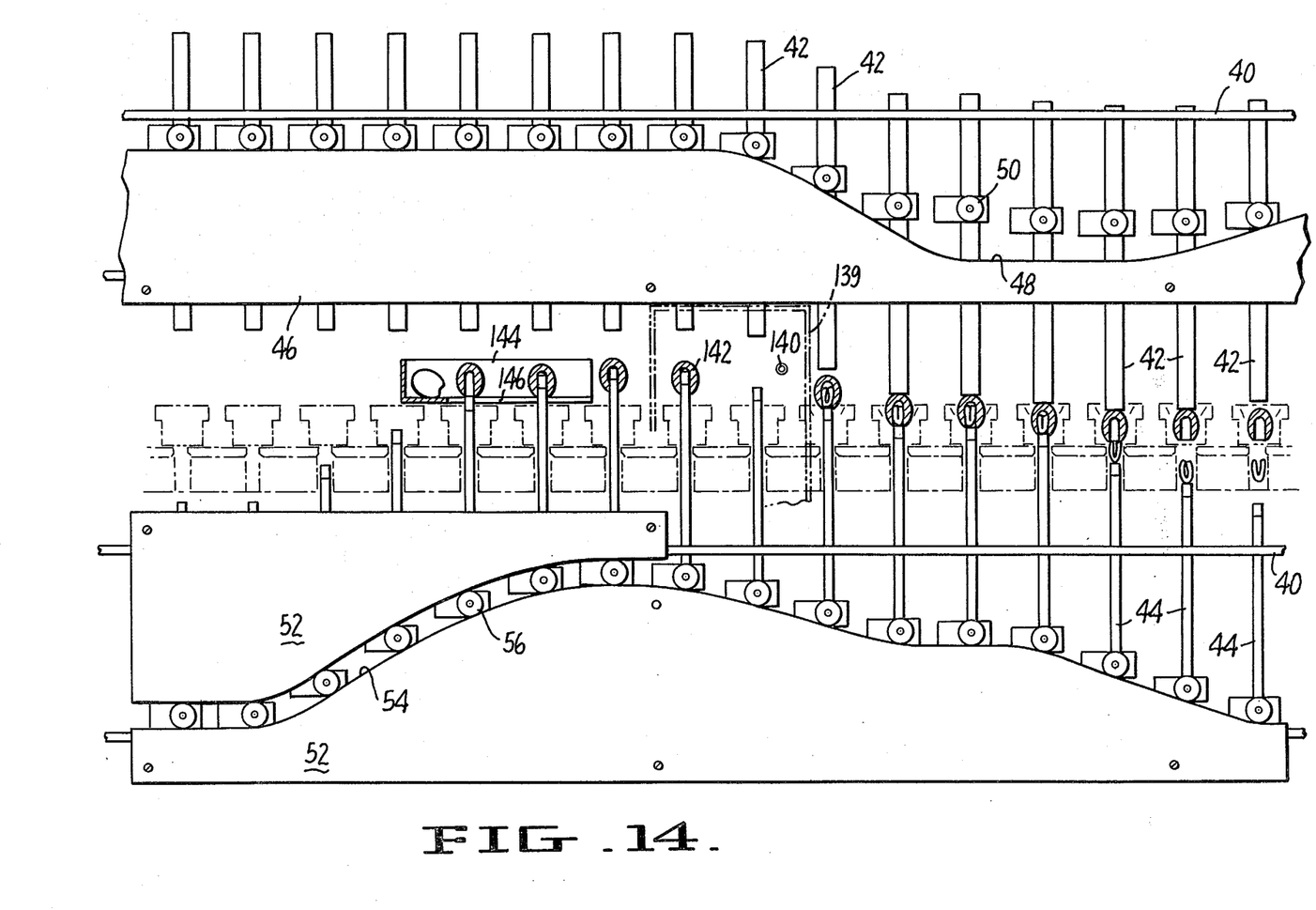
FIG. 14 shows in layout fashion a semi-circular portion of the stuffing turret of the machine.

The transfer of the stuffing pieces into the olives is shown in FIG. 14. The hold-down rods 42 hold the pitted olives down in the cups as the square ends of ejector rods 44 move the stuffing pieces upwardly from the cut-off piece pockets through the plate apertures 138 into the olives. Thereafter the stuffed olives are ejected by the rods 44 into the stuffed olive discharge chute 139. An air jet 140 (FIG. 14) is preferably employed to blow the stuffed olives off of the upper ends of the rods 44 into the discharge chute 139.

In the event that some of the olives remain unstuffed, the rods 44 enter the pit cavities of the unstuffed olives, as at 142 in FIG. 14, and prevent these olives from being blown off of the rods 44 by the jet 140. Such unstuffed olives are carried by the rods to a second discharge chute 144, the rods traveling in a suitable slot 146 of the chute 144, where they are stripped from the rods as the rods are moved downwardly. The unstuffed olives are thus segregated and collected apart from the stuffed olives.

Figures 11, 12, 13:
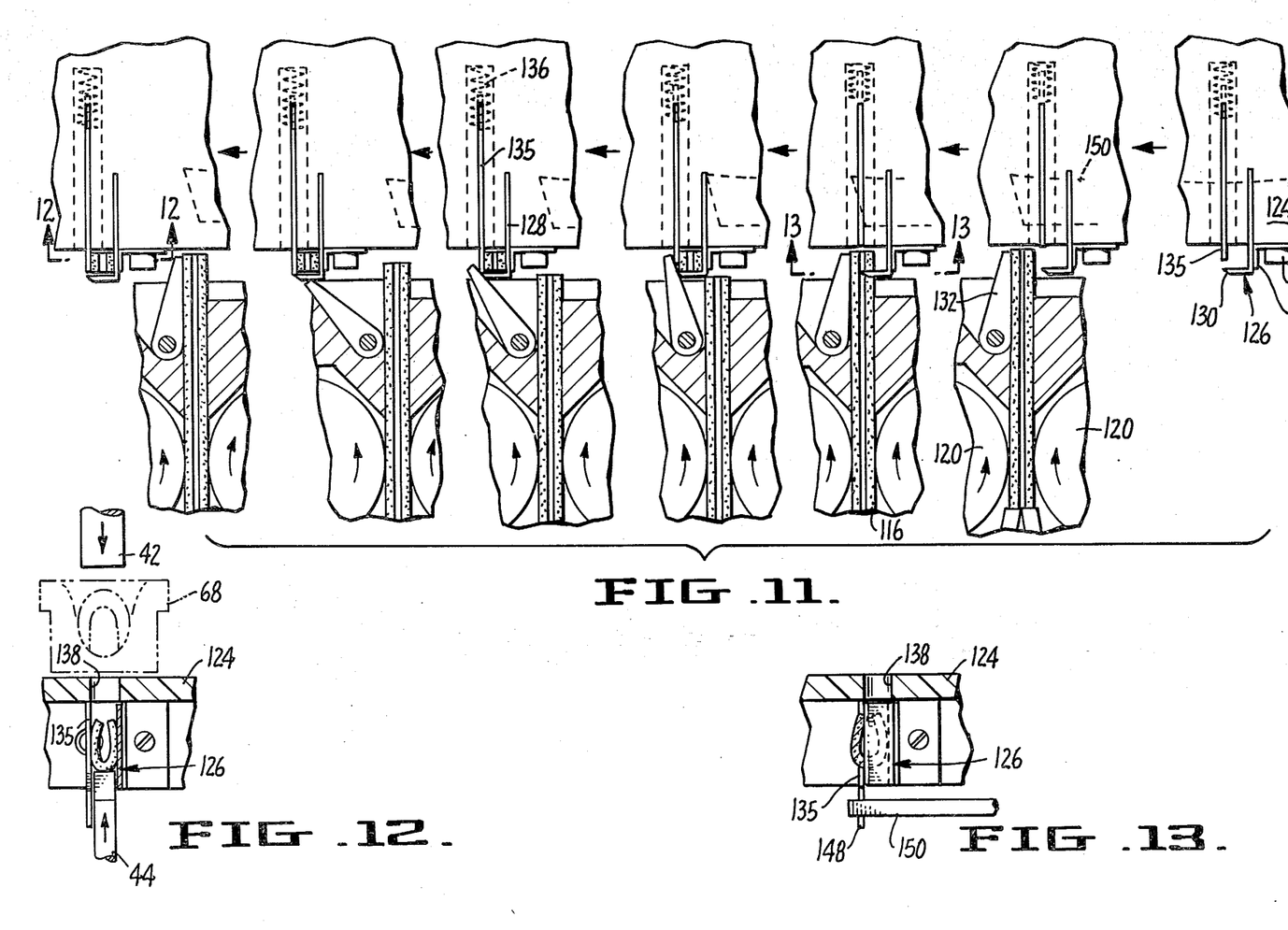
FIG. 11 is a view in the same direction as that of FIG. 9 but showing in a sequential way the manner of operation of the pimento cut-off means of the machine.
FIG. 12 is an enlarged detail view taken along lines 12—12 of FIG. 11.
FIG. 13 is an enlarged detail view taken along lines 13—13 of FIG. 11.

Retraction of the blade members 135 to permit the cut-off and capture of the stuffing pieces is provided by interengagement of dogs 148 carried by the members 135 and a stationary cam member 150 mounted beneath plate 124.

The knives 126 are fixedly attached to clip members 152 (FIG. 11) which are secured to plate 124 by removable fasteners 154. Shims may be placed between the clips 152 and the plate 124 to control the width of the stuffing strip pieces cut by the knives 126.

The machine is a rugged, precision machine which is capable of pitting and stuffing 800 and more olives per minute with minimum risks of breakdown and minimum requirements of maintenance and service work.

What is claimed is:

1. An olive pitting and stuffing machine comprising first and second spaced, parallel, vertical shafts, aligned sprockets secured to said shafts for rotation therewith, an endless chain trained about said sprockets and in mesh with said sprockets, olive conveying cups carried by said chain and adapted to support and convey singleton olives with their longitudinal axes substantially vertically disposed, pairs of plate members secured to each shaft for rotation therewith both above and below the sprocket secured thereto, said plate members extending into overlying and underlying relation with said cups, opposed sets of olive pitting and coring knives carried for movement toward and away from each other by the plate members secured to said first shaft, first stationary means disposed outwardly of the plate members secured to said first shaft to move said pitting and coring knives toward each other into engagement with the pits of olives in said cups, thereafter together in the same direction to remove the pits of said olives, and thereafter apart and out of engagement with said olives, holding means carried by said second shaft for positioning stuffing pieces in alignment with said cups, opposed olive hold-down means and stuffing piece ejection rod means carried for movement toward and away from each other by the plate members secured to said second shaft, and second stationary means disposed outwardly of the plate members secured to said second shaft to move said hold-down means into engagement with olives in said cups, thereafter to move said ejection means to transfer stuffing pieces from said holding means into said olives, and thereafter to move said hold-down means away from said olives, and continuous drive means for one of said shafts operable through said sprockets and endless chain to also continuously drive the other of said shafts.

2. The machine of claim 1, said first means comprising cam trackways positioned concentric to said first shaft and trackway followers carried by said pitting and coring knives in engagement therewith, said second means comprising cam trackways positioned concentric to said second shaft and trackway followers carried by said hold-down means and by said ejection means in engagement therewith.

3. The machine of claim 2, including means for yieldingly varying the distance between said pitting and coring knives as they engage the pits of olives in order to handle olive pits of varying size, said means comprising a spring-pressed, yieldingly movable section in the cam trackway associated with the trackway followers carried by one of the sets of pitting and coring knives.

4. The machine of claim 1, including olive feed means for said cups positioned adjacent the location at which said chain comes off of the sprocket on said second shaft, the vibration means to vibrate said cups and work the feed olives down into the cups with their long axes vertical, said vibration means including rail support means enclosing a portion of said chain as the latter travels from the sprocket on the second shaft to the sprocket on the first shaft and a fluid driven, high speed oscillator attached to said rail support means.

5. The machine of claim 1, including separator means to separate unstuffed pitted olives from stuffed pitted olives, said separator means comprising a first discharge station for stuffed pitted olives and olive ejection rod means operable after movement of said olive hold-down means away from the olives and the lifting of the stuffed pitted olives out of the cups by said olive ejection rod means to discharge stuffed pitted olives from said machine at said first discharge station, said separator means comprising a second discharge station for unstuffed pitted olives and comprising said olive rejection rod means which serves to impale and retain thereon unstuffed pitted olives and comprising means to strip said olives from said rod means and to discharge them from said machine at said second discharge station.

* * * * *